Figure 1:
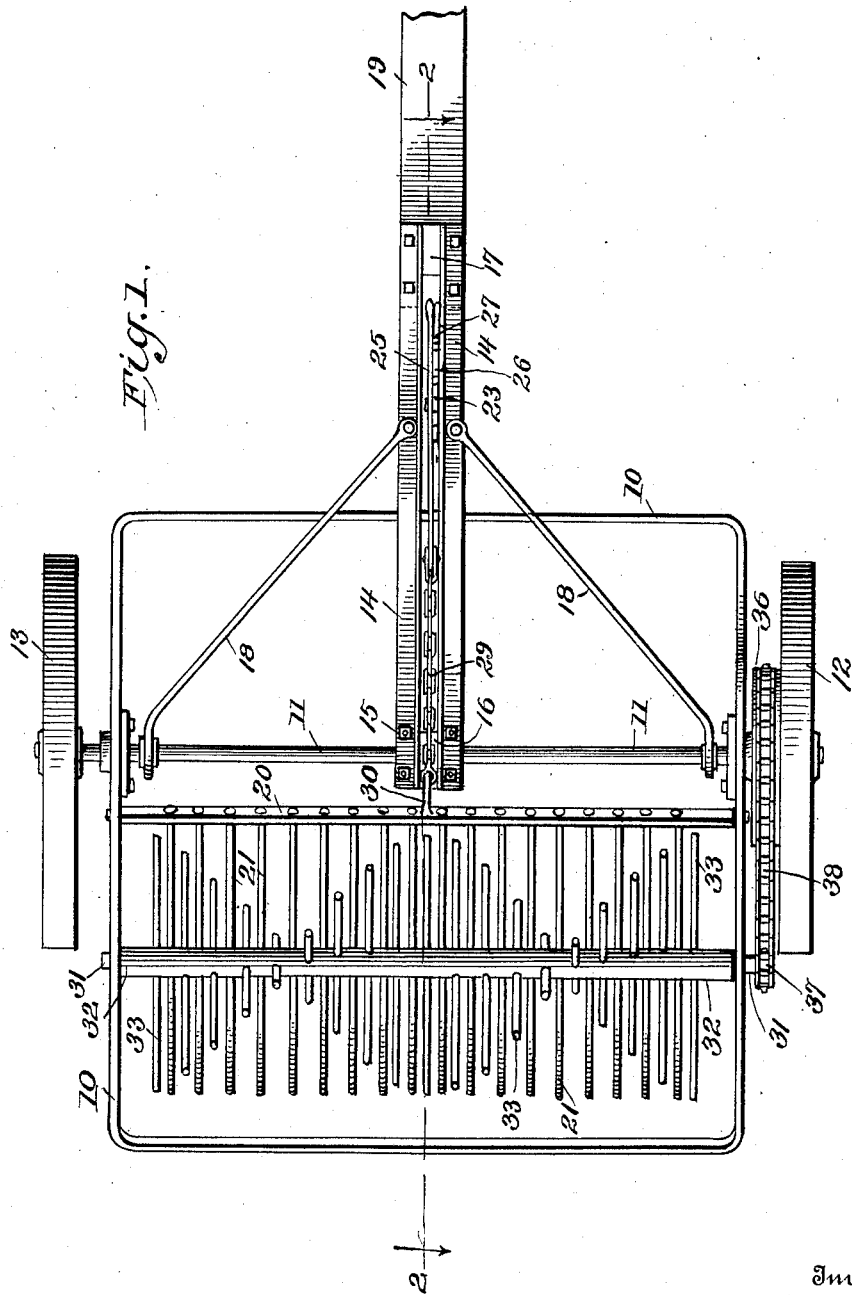

A. VEITL.
SOD PULVERIZER AND WEED DESTROYER.
APPLICATION FILED SEPT. 26, 1911.

1,038,240.

Patented Sept. 10, 1912.
2 SHEETS—SHEET 1.

Witnesses

Inventor
Albert Veitl
By
A. P. Stacy, Attorney.

A. VEITL.
SOD PULVERIZER AND WEED DESTROYER.
APPLICATION FILED SEPT. 26, 1911.
1,038,240.
Patented Sept. 10, 1912.
2 SHEETS—SHEET 2.
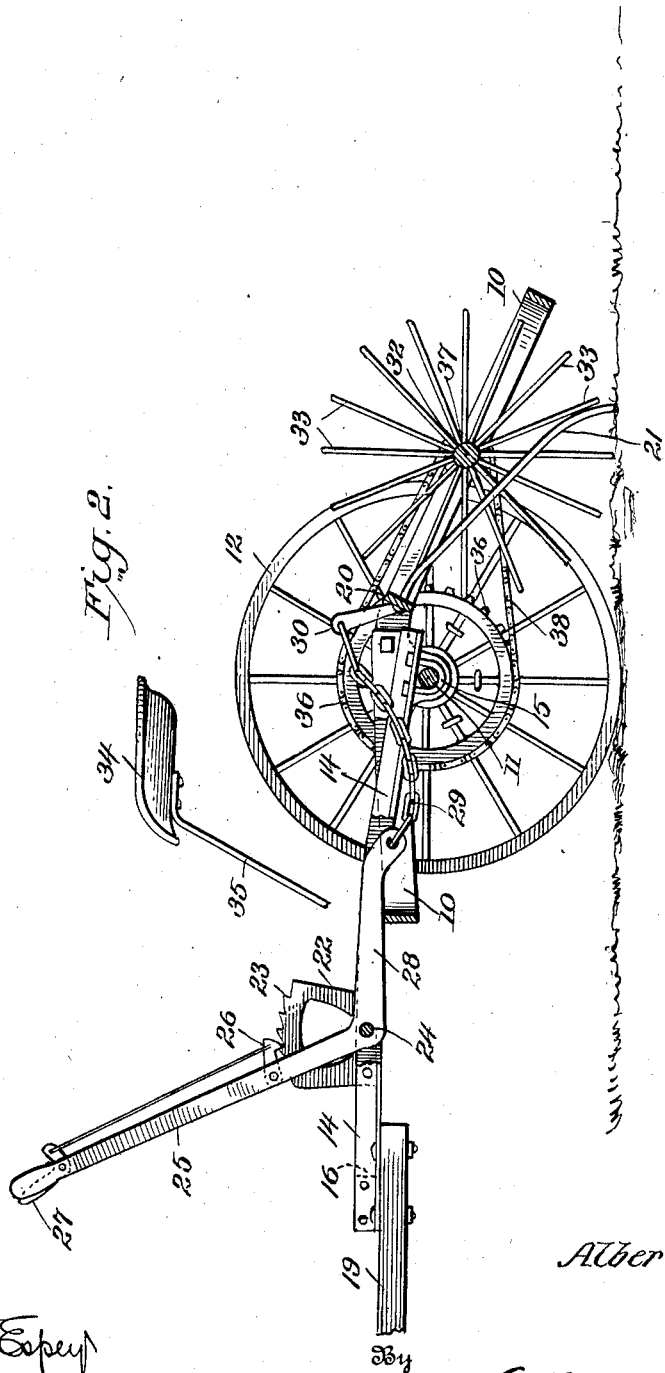
Inventor
Albert Veitl
Witnesses
By
A. B. Stacy, Attorney.

UNITED STATES PATENT OFFICE.

ALBERT VEITL, OF DEADWOOD, SOUTH DAKOTA.

SOD-PULVERIZER AND WEED-DESTROYER.

1,038,240.  Specification of Letters Patent.  Patented Sept. 10, 1912.

Application filed September 26, 1911. Serial No. 651,421.

*To all whom it may concern:*

Be it known that I, ALBERT VEITL, citizen of the United States, residing at Deadwood, in the county of Lawrence and State of South Dakota, have invented certain new and useful Improvements in Sod-Pulverizers and Weed-Destroyers, of which the following is a specification.

This invention relates to improvements in agricultural implements of the class employed for pulverizing the soil and destroying weeds after the plowing operations and prior to the seeding, and operating as a combined harrow and pulverizer.

Another object of the invention is to produce a simply constructed machine which takes the place of an ordinary harrow but also disintegrates weeds, grass, corn stubble and accumulations of a like nature and prepares the soil for the seeding operations.

With these and other objects in view, the invention consists in certain novel features of construction as hereafter shown and described, and then specifically pointed out in the claims, and in the drawings illustrative of the preferred embodiment of the invention: Figure 1 is a plan view of the improved device; Fig. 2 is a side elevation.

Corresponding and like parts are referred to in the following description and indicated in all the views of the accompanying drawings by the same reference characters.

The improved device comprises a main supporting frame represented as a whole at 10 and preferably rectangular, and formed of metal of sufficient strength to withstand the strains to which it will be subjected when in use and likewise to resist any tendency to twist when one of the bearing wheels drops into a depression or rut.

The frame 10 supports an axle 11 to which carrier wheels 12—13 are journaled. A tongue frame is coupled to the axle and comprises two bars 14 preferably of L iron which extend over the forward member of the frame 10. The bars 14 are secured in any suitable manner to the axle, as for instance by clips 15, and are provided with spacer blocks 16—17 at the ends. The axle 11 is furthermore coupled to the members 14 by braces 18, so that the members 14 are rigidly supported relative to the axle. The draft tongue, a portion of which is represented at 19, is bolted or otherwise secured to the members 14 beneath their forward ends.

Pivoted at its ends between the side members of the frame 10 and rearwardly of the axle, is a head member 20 having a plurality of rearwardly directed rods 21, the rods being curved downwardly at their rear ends and forming combined raker teeth and clearers for the rotating members as hereafter explained. Bolted or otherwise secured between the members 14 in advance of the forward member of the frame 10 is a plate 22 having a ratchet segment 23 formed in its upper edge. Pivoted at 24 to the plate 22, is a lever 25 having a pawl 26 arranged to engage the ratchet teeth of the plate and with a grip lever 27 connected to the pawl and convenient to the handle of the lever. The lever 25 extends below the pivot 24 and is curved rearwardly, as shown at 28, and extends over the forward member of the frame 10. By this arrangement it will be obvious that when the lever 25 is moved rearwardly, the extension 28 will bear upon the frame 10 in advance of the axle and thus depress the forward end and elevate the rear end and thus correspondingly elevate the bar 20 and the teeth 21. A chain 29 is connected at one end to the extension 28 of the lever and connected at its other end to an arm 30 rising from the bar 20. By this arrangement it will be obvious that when the lever 25 is actuated to cause the extension 28 to depress the forward portion of the frame, the chain 29 co-acting with the arm 30, will oscillate the bar 20 upon its feet and elevate the fingers 21 to a greater extent than they would be elevated by the depression of the forward end of the frame.

Journaled at 31 in the side members of the frame 10 rearwardly of the bar 20, is a roller 32 having a plurality of rods 33 extending radially therefrom and preferably arranged in screw-like form as shown. The rods 33 are so spaced that each rod passes between a pair of the fingers 21. A driver's seat 34 is connected to one of the members 14 preferably by a standard 35.

A chain wheel 36 is connected to one of the bearing wheels, preferably the wheel 12, while a chain pinion 37 is connected to the pivot 31 of the drum 32 with a chain 38 leading over the chain wheel and its pinion, so that as the machine is drawn forward the motion of the bearing wheel is imparted to the drum 32 and causes the rods 33 to act as picker teeth against the soil.

With the machine thus constructed, it will be obvious that as the machine is drawn forward, the teeth 21 drag over the soil, while the teeth or rods 33 being rapidly rotated disintegrate the sods, corn stubble and other obstructions and thoroughly pulverize them and tear the weeds loose from the soil, while the rods or dragging teeth 21 counteract the action of the beater teeth 33, causing them to thoroughly break up the particles of weeds, corn stalks or stubble and other material of a similar nature and likewise effectually breaks up the larger particles of manure or other like material which may have been deposited upon the soil. The arrangement of the lever 25 operating over the segment 22—23 enables the operator to adjust the frame and its attachments relative to the soil so as to operate at a greater or lesser depth and thus control the operation of the beater and the raker teeth.

The beater teeth 33 being arranged in a screw-like form only a few of the teeth engage the soil at the same time, thus decreasing the "draft" without decreasing the efficiency.

The improved device is simple in construction, can be inexpensively manufactured, and operates effectually for the purposes described.

What I claim is:

1. In a machine of the class described, an axle having bearing wheels, a supporting frame swinging upon said axle, a plurality of rearwardly directed raker teeth mounted to swing upon said frame rearwardly of said axle, a drum mounted for rotation upon said frame rearwardly of said raker teeth, a plurality of beater teeth extending radially from said drum, each beater tooth operating between a pair of the raker teeth, and means for simultaneously elevating said raker teeth and the rear portion of the frame and the beater teeth carried thereby.

2. In a machine of the class described, an axle having bearing wheels, a supporting frame swinging upon said axle, a head member pivoted in said frame rearwardly of the axle, a plurality of raker teeth connected to said head and extending rearwardly thereof, a drum mounted for rotation upon said frame rearwardly of said head, a plurality of beater teeth extending radially from said drum, each beater tooth operating between a pair of the raker teeth, a tongue frame connected to said axle and extending forwardly above the supporting frame, a lever swinging from said tongue frame and including a rearward extension bearing upon the supporting frame, and means for holding said lever in adjusted position.

3. In a machine of the class described, an axle having bearing wheels, a supporting frame swinging upon said axle, a head member pivoted in said frame rearwardly of the axle, a plurality of raker teeth connected to said head and extending rearwardly thereof, a drum mounted for rotation upon said frame rearwardly of said head, a plurality of beater teeth extending radially from said drum, each beater tooth operating between a pair of the raker teeth, a tongue frame connected to said axle and extending forwardly above the supporting frame, a lever swinging from said tongue frame and including a rearward extension bearing upon the supporting frame, means for holding said lever in adjusted position, and coupling means between said lever extension and said raker head.

In testimony whereof I affix my signature in presence of two witnesses.

ALBERT VEITL. [L. S.]

Witnesses:
JOSEPH SCHWING,
S. B. ZACABE.

---

Copies of this patent may be obtained for five cents each, by addressing the "Commissioner of Patents, Washington, D. C."